Figure 1:
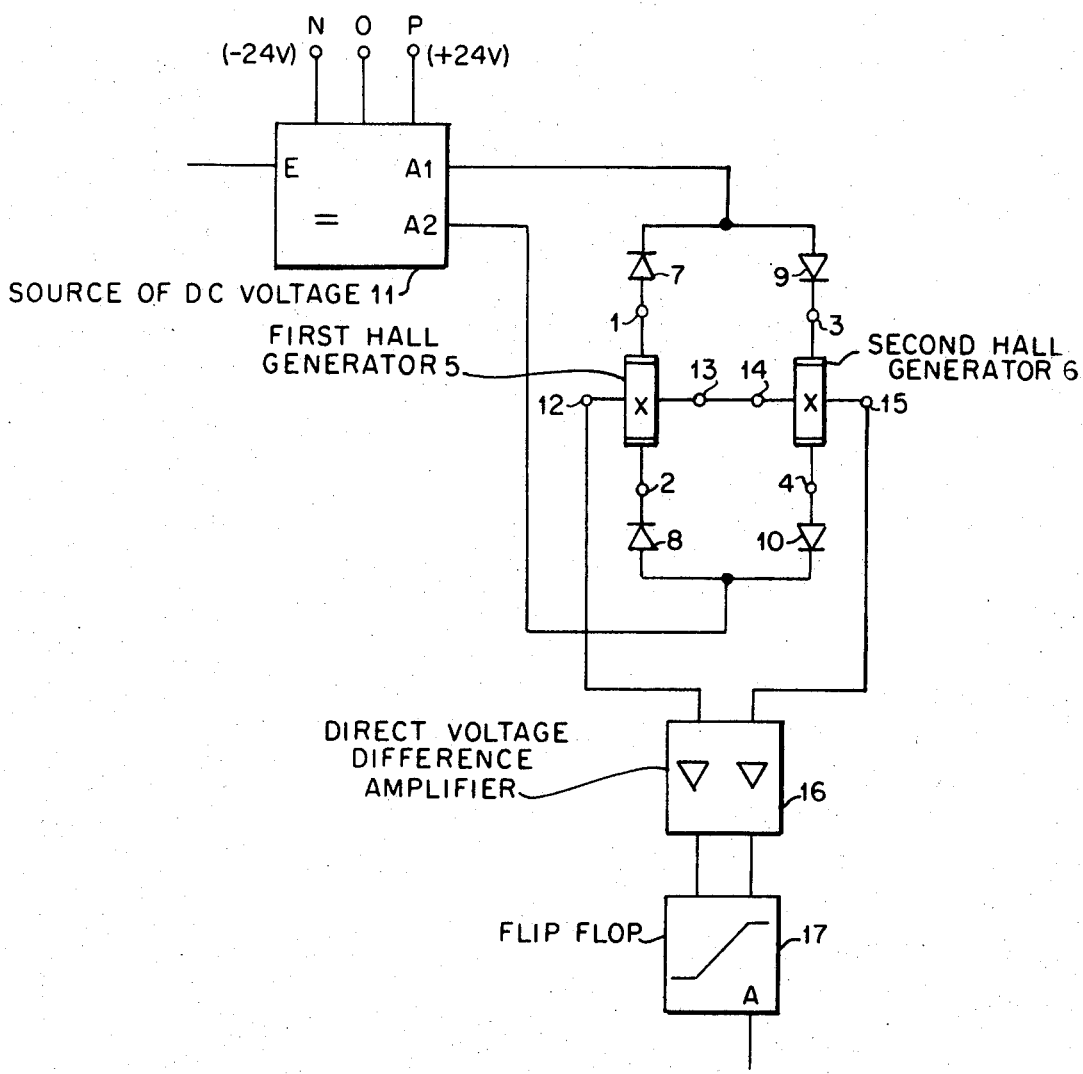

United States Patent

[11] 3,558,934

| [72] | Inventors | Gerhard Dorsch<br>Weissenbrunn;<br>Wolfgang Wagnerberger, Nurnberg,<br>Germany |
|---|---|---|
| [21] | Appl. No. | 776,067 |
| [22] | Filed | Nov. 15, 1968 |
| [45] | Patented | Jan. 26, 1971 |
| [73] | Assignee | Siemens Aktiengesellschaft<br>Berlin, Germany<br>a corporation of Germany |
| [32] | Priority | Nov. 18, 1967 |
| [33] | | Germany |
| [31] | | 1,537,418 |

[54] APPARATUS FOR SENSING MAGNETIC SIGNALS
7 Claims, 3 Drawing Figs.

[52] U.S. Cl................................................... 307/309,
324/45
[51] Int. Cl....................................................H03k 17/80
[50] Field of Search........................................... 307/309;
324/45; 338/32

[56] References Cited
UNITED STATES PATENTS
2,988,650  6/1961  Weiss............................ 307/309
3,194,886  7/1965  Mason........................... 307/309

Primary Examiner—Donald D. Forrer
Assistant Examiner—Harold A. Dixon
Attorneys—Curt M. Avery, Arthur E. Wilfond, Herbert L. Lerner and Daniel J. Tick ABSTRACT: Each of a plurality of diodes couples a corresponding one of the control current electrodes of a pair of Hall generators to a corresponding one of a pair of output terminals of a source of DC voltage of reversible polarity which provides at its output terminals output voltages different from each other in polarity and each of alternately different polarity. The diodes are connected with such polarities that only one of the Hall generators at a time is provided with control current from the source of DC voltage. A direct voltage difference amplifier is connected in series with the Hall voltage electrodes of the Hall generators. A flip flop is connected to the difference amplifier.

APPARATUS FOR SENSING MAGNETIC SIGNALS

DESCRIPTION OF THE INVENTION

The present invention relates to apparatus for sensing magnetic signals. More particularly, our invention relates to apparatus for sensing magnetic signals in angle encoders. Still more particularly, our invention relates to apparatus for sensing or reading magnetic signals with the aid of sensing members constituted by two Hall generators, which are spaced a specific distance from each other. The Hall voltage signals are amplified and supplied to a logic circuit, preferably for the purpose of encoding, in accordance with the V scanning principle.

For univalent derivation of the necessary signals, the application of the V scanning principle in angle encoders requires the use of two sensing elements which are spaced from each other a specific distance. Only one of the output signals from the sensing elements is evaluated at a time; the evaluation shifting alternately from one signal to the other. In angle encoders utilizing Hall generators and a magnetic subdivision or scale of indicia, it has heretofore only been possible to operate by first passing the Hall voltage signals through respective direct voltage amplifiers and then applying the amplified signals to a logic circuit which provides the aforementioned alternating selection of the different signals.

The principal object of the present invention is to provide new and improved apparatus for sensing magnetic signals.

An object of the present invention is to provide new and improved apparatus for sensing magnetic signals in angle encoders.

An object of the present invention is to provide apparatus for sensing magnetic signals in angle encoders, which apparatus is of simple structure and functions with efficiency, effectiveness and reliability.

An object of our invention is to provide apparatus for sensing magnetic signals in angle encoders operating on the V scanning principle, utilizing Hall generators as scanning elements, in which a smaller number of direct voltage difference amplifiers is needed and in which the flip-flop stages connected to such amplifiers are consequently also reduced in number.

To this end, and in accordance with our invention, we connect each control current electrode of the two Hall voltage generators through respective diodes to the output terminals of a single source of DC voltage, direct voltage, or direct current whose polarity is reversible, and we select the polarity of the diodes so that only one of the Hall generators is supplied with control current at a time. The Hall voltage electrodes of the Hall generators are connected in series to a single direct voltage difference amplifier followed by a flip-flop.

It is particularly advantageous that the control input of the source of DC voltage and the output of the flip-flop can be connected to a common potential. This permits any desired number of the described devices to operate conjointly and to be energized from a common current supply or from the same utility line. It is further possible to use logic direct current circuits operating with a common reference potential.

In accordance with the present invention, apparatus for sensing magnetic signals comprises first and second Hall generators spaced from each other and each having a pair of control current electrodes and a pair of Hall voltage electrodes. A source of DC voltage of reversible polarity has a pair of output terminals for providing at the output terminals output voltages different from each other in polarity and each of alternately different polarity. Each of a plurality of diodes couples a corresponding one of the control current electrodes of the Hall generators to a corresponding one of the output terminals of the source of DC voltage. The diodes are connected with such polarities that only one of the Hall generators at a time is provided with control current from the source of DC voltage. A direct voltage difference amplifier has outputs and input terminals connected in series with the Hall voltage electrodes of the Hall generators. A flip-flop is connected to the outputs of the direct voltage difference amplifier.

One of the diodes is connected at its anode to one of the control current electrodes of the first Hall generator and at its cathode to one of the output terminals of the source of DC voltage. Another of the diodes is connected at its cathode to the other of the control current electrodes of the first Hall generator and at its anode to the other of the output terminals of the source of DC voltage. A third of the diodes is connected at its cathode to one of the control current electrodes of the second Hall generator and at its anode to the one of the output terminals of the source of DC voltage. A fourth of the diodes is connected at its anode to the other of the control current electrodes of the second Hall generator and at its cathode to the other of the output terminals of the source of DC voltage.

The source of DC voltage has an input and the flip-flop has an output, and the input and the output are referred to a common potential. One of the Hall voltage electrodes of the first Hall generator is directly connected to one of the Hall voltage electrodes of the second Hall generator. The other Hall voltage electrode of the first Hall generator is directly connected to one of the input terminals of the direct voltage difference amplifier, and the other Hall voltage electrode of the second Hall generator is directly connected to the other of the input terminals of the direct voltage difference amplifier.

Figure 2A:
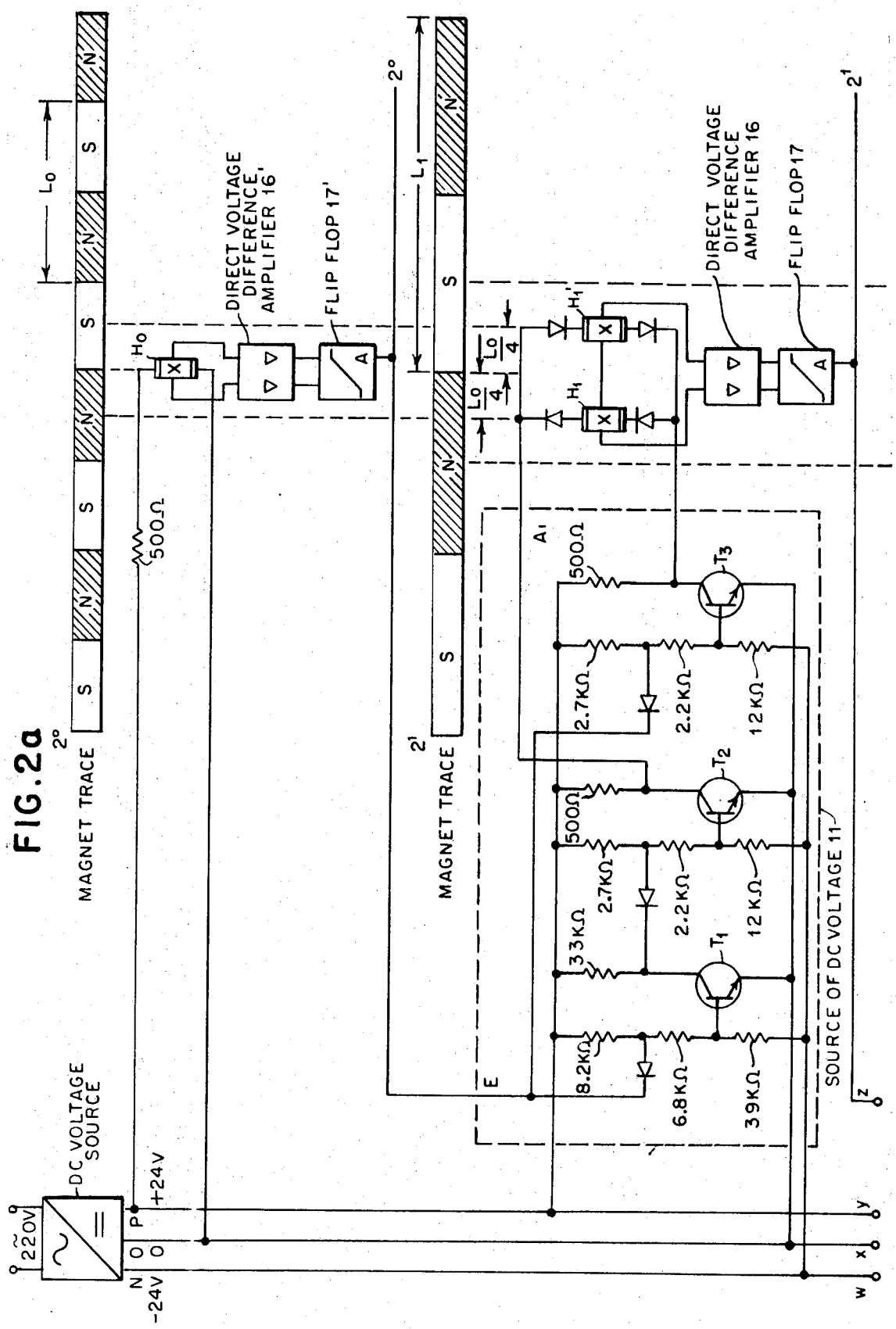
Figure 2B:
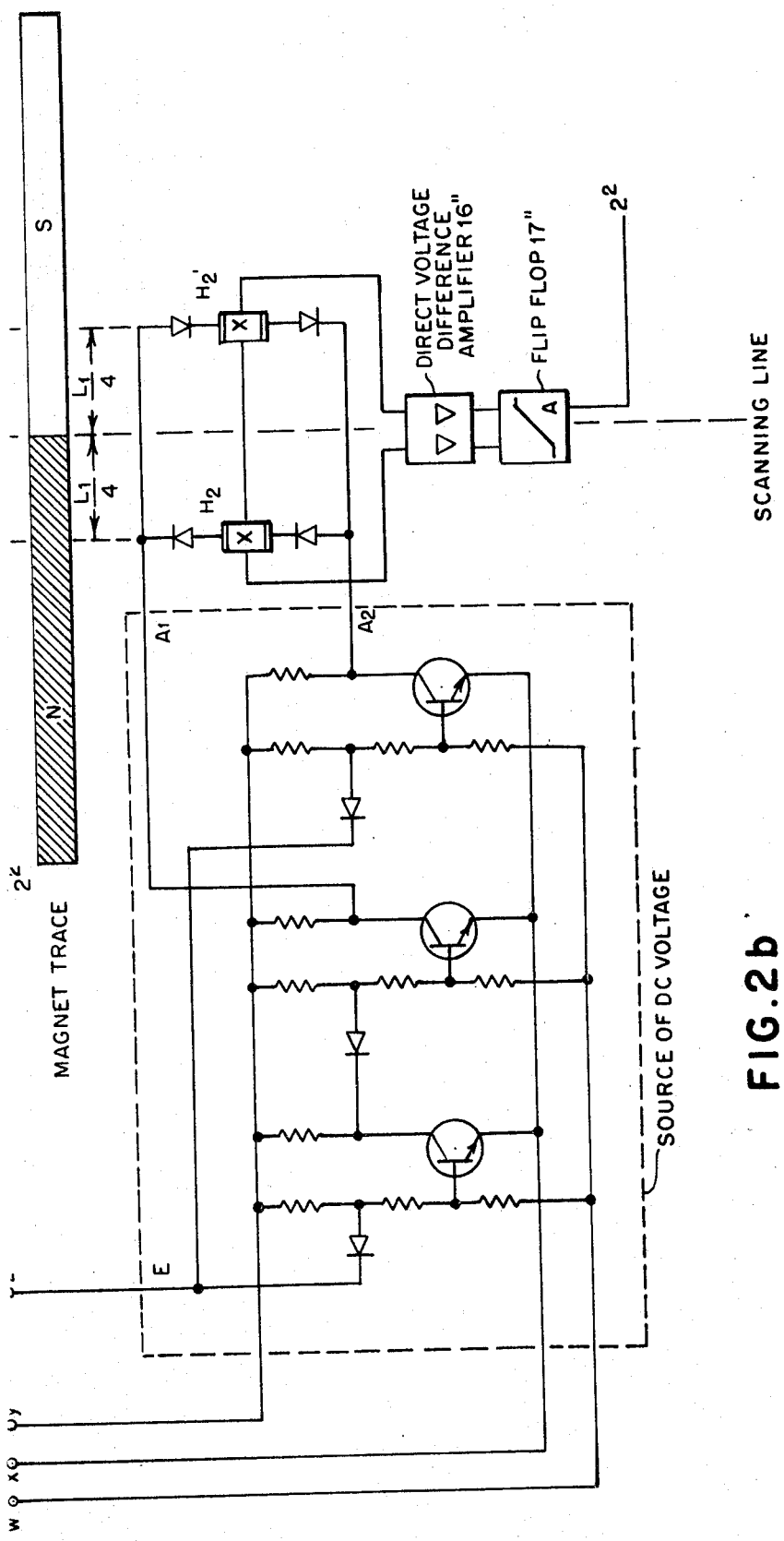

In order that the present invention may be readily carried into effect, it will now be described with reference to the accompanying drawings, wherein:

FIG. 1 is a block diagram of an embodiment of the apparatus of the present invention for sensing magnetic signals; and FIGS. 2a and 2b, are circuit diagrams of an embodiment of a dual code angle encoder utilizing the apparatus of the present invention.

In FIG. 1, a first Hall generator 5, comprising a rectangular plate of indium antimonide, for example, has a pair of control current electrodes 1 and 2 and a pair of Hall voltage electrodes 12 and 13. A second Hall generator 6, comprising a rectangular plate of indium antimonide, for example, has a pair of control current electrodes 3 and 4 and a pair of Hall voltage electrodes 14 and 15. The first and second Hall generators 5 and 6 may be identical with each other.

The control current electrodes 1 to 4 are connected in a loop with each other through interposed diodes 7, 8, 9 and 10. The loop is energized from a source 11 of DC voltage, direct voltage or direct current whose polarity is reversible. The Hall voltage electrodes 12 to 15 are connected in series across the input terminals of a direct voltage difference amplifier 16 whose output is connected to the input of a flip-flop 17.

The polarity of the output voltage provided at the output terminals A1 and A2 of the direct current source 11 is determined by a binary control signal arriving at the control input E of said source. In order to have only one of the two Hall generators 5 and 6 supplied with control current at a time, while requiring but a single direct current source 11 of reversible polarity, the pole A1 of said source is coupled through the diode 7 or the diode 9 to the control current electrode 1 or 3 of said Hall generators, whereas the pole A2 of said source is coupled through the diode 8 or the diode 10 to the other control current electrode 2 or 4 of said Hall generators.

The cathode of the first diode 7 is connected to the terminal A1 of the DC voltage source 11 and the anode of said diode is connected to the control current electrode 1 of the first Hall generator 5. The anode of the second diode 8 is connected to the terminal A2 of the DC voltage source 11 and the cathode of said diode is connected to the other control current electrode 2 of the first Hall generator 5. The anode of the third diode 9 is connected to the terminal A1 of the DC voltage source 11 and the cathode of said diode is connected to the control current electrode 3 of the second Hall generator 6. The cathode of the fourth diode 10 is connected to the terminal A2 of the DC voltage source 11 and the anode of said diode is connected to the other control current electrode 4 of the second Hall generator 6.

The polarities of the diodes 7, 8, 9 and 10 are thus such that at one polarity of the output of the current source 11 only one of the Hall generators 5 and 6 is provided with control current, and at the opposite polarity of said output the other of said Hall generators is provided with control current. For example, when the binary control signal supplied to the input E of the current source 11 provides a positive polarity output at the output terminal A1, only the second Hall generator 6 is supplied with control current through the third and fourth diodes 9 and 10. However, when the binary control signal supplied to the input terminal E provides a positive polarity output at the output terminal A2 of the current source 11, the first Hall generator 5 is provided with control current through the first and second diodes 7 and 8.

The Hall voltage electrode 12 of the first Hall generator 5 is connected to one input of the direct voltage difference amplifier 16. The other Hall voltage electrode 13 of the first Hall generator 5 is connected to the Hall voltage electrode 14 of the second Hall generator 6. The other Hall voltage electrode 15 of the second Hall generator 6 is connected to the other input of the direct voltage difference amplifier 16.

The binary output signal of the flip-flop 17 and the binary control signal supplied to the input terminal E of the current source 11, for determining the polarity of the output of said source, are referred to a common potential. Consequently, any desired number of units comprising the aforedescribed apparatus may be operated together and can be energized from a common power supply line. The polarity of the DC voltage source 11 is determined by superordinated signals in accordance with the principle of the V scanning method.

FIG. 2 is an embodiment of a dual code angle encoder, with 8 angle regions per revolution. The principle of V scanning is illustrated in two devices according to the invention. The angle encoder comprises on a common drum, magnet traces for the three dual positions $2^0, 2^1, 2^2$.

The magnet trace or path "$2^0$" has four magnetization periods, that is, four South poles and four North poles, and is scanned by a Hall generator $H_0$. The magnet trace "$2^1$" has two magnetizing periods and the magnet trace "$2^2$" has only one magnetizing period. The last-mentioned two traces are scanned according to the known principle of V scanning, by means of a pair of Hall generators $H_1$ and $H_1'$, or $H_2$ and $H_2'$.

The Hall generators $H_1$ and $H_1'$ are displaced, in relation to the scanning line, by $\pm L_0/4$, wherein $L_0$ is the wavelength of the trace $2^0$, and the Hall generators $H_2$ and $H_2'$ are displaced by $\pm L_1/4$, wherein $L_1$ is the wavelength of the trace $2^1$.

The direct voltage difference amplifier 16' and the flip-flop 17' are so wired that the binary signal at the output A, may assume the values zero volts or +24 volts, respectively. If the assigned Hall generator $H_0$ is located above a North pole, then the output A and, hence, also the input E of the reversible current source 11, connected to the output side, is zero volts. The transistors $T_1$ and $T_3$ are thus in nonconductive condition and the transistor $T_2$ is in conductive condition. As a result, the output $A_2$ of the current source becomes positive with respect to the output $A_1$. The control current flows to the Hall generator $H_1$ and the Hall generator $H_1'$ is not in operation.

If, on the other hand, the Hall generators $H_0$ is located above a South pole, the +24 volts signal is provided at output A of the critical value stage. The transistors $T_1$ and $T_3$ are conductive and the transistor $T_2$ is nonconductive. Thus, $A_1$ is positive with respect to $A_2$. The control current flows to the Hall generator $H_1'$ and the Hall generator $H_1$ is not in operation. This ensures that the pair of Hall generators $H_1$ and $H_1'$, signals the polarity reversal of the magnet or magnetization trace at exactly the same angular position as the Hall generator $H_0$.

In complete analogy thereto, the binary signal applied at the output A of the trace "$2^1$" controls the reversible current source 11 for the pair of Hall generators $H_2$ and $H_2'$.

While the invention has been described by means of a specific example and in a specific embodiment, we do not wish to be limited thereto, for obvious modifications will occur to those skilled in the art without departing from the spirit and scope of the invention.

We claim:
1. Apparatus for sensing magnetic signals, comprising first and second Hall generators spaced from each other and each having a pair of control current electrodes and a pair of Hall voltage electrodes;

a source of DC voltage of reversible polarity having a pair of output terminals for providing at said output terminals output voltages different from each other in polarity and each of alternately different polarity;

a plurality of diodes each coupling a corresponding one of the control current electrodes of said Hall generators to a corresponding one of the output terminals of said source of DC voltage, said diodes being connected with such polarities that only one of said Hall generators at a time is provided with control current from said source of DC voltage;

a direct voltage difference amplifier having outputs and input terminals connected in series with the Hall voltage electrodes of said Hall generators; and a flip-flop connected to the outputs of said direct voltage difference amplifier.

2. Apparatus as claimed in claim 1, wherein one of said diodes is connected at its anode to one of the control current electrodes of the first Hall generator and at its cathode to one of the output terminals of said source of DC voltage and another of said diodes is connected at its cathode to the other of the control current electrodes of said first Hall generator and at its anode to the other of the output terminals of said source of DC voltage.

3. Apparatus as claimed in claim 1, wherein said source of DC voltage has an input and said flip-flop has an output, and said input and said output are referred to a common potential.

4. Apparatus as claimed in claim 1, wherein one of the Hall voltage electrodes of the first Hall generator is directly connected to one of the Hall voltage electrodes of the second Hall generator, the other Hall voltage electrode of said first Hall generator is directly connected to one of the input terminals of said direct voltage difference amplifier, and the other Hall voltage electrode of said second Hall generator is directly connected to the other of the input terminals of said direct voltage difference amplifier.

5. Apparatus as claimed in claim 2, wherein a third of said diodes is connected at its cathode to one of the control current electrodes of the second Hall generator and at its anode to the one of the output terminals of said source of DC voltage and a fourth of said diodes is connected at its anode to the other of the control current electrodes of said second Hall generator and at its cathode to the other of the output terminals of said source of DC voltage.

6. Apparatus as claimed in claim 5, wherein said source of DC voltage has an input and said flip-flop has an output, and said input and said output are referred to a common potential.

7. Apparatus as claimed in claim 5, wherein one of the Hall voltage electrodes of the first Hall generator is directly connected to one of the Hall voltage electrodes of the second Hall generator, the other Hall voltage electrode of said first Hall generator is directly connected to one of the input terminals of said direct voltage difference amplifier, and the other Hall voltage electrode of said second Hall generator is directly connected to the other of the input terminals of said direct voltage difference amplifier.